United States Patent
Morisawa

(10) Patent No.: US 7,818,813 B2
(45) Date of Patent: Oct. 19, 2010

(54) SERVER APPARATUS AND CONTROL METHOD

(75) Inventor: Shuichi Morisawa, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1192 days.

(21) Appl. No.: 11/433,473

(22) Filed: May 15, 2006

(65) Prior Publication Data

US 2006/0265762 A1    Nov. 23, 2006

(30) Foreign Application Priority Data

May 20, 2005    (JP)    ............................. 2005-148562

(51) Int. Cl.
*G06F 17/30*    (2006.01)

(52) U.S. Cl. .......................... 726/27; 726/2

(58) Field of Classification Search .................... 726/27
See application file for complete search history.

(56) References Cited

U.S. PATENT DOCUMENTS

| | | | |
|---|---|---|---|
| 6,189,006 B1 * | 2/2001 | Fukushima | .................... 707/6 |
| 6,622,248 B1 * | 9/2003 | Hirai | ........................... 713/193 |
| 2002/0038421 A1 * | 3/2002 | Hamada | ...................... 713/171 |
| 2003/0033297 A1 * | 2/2003 | Ogawa | ........................... 707/3 |
| 2004/0220919 A1 * | 11/2004 | Kobayashi | ...................... 707/3 |

FOREIGN PATENT DOCUMENTS

| | | |
|---|---|---|
| JP | 2000-011001 | 1/2000 |
| JP | 2002-278970 A | 9/2002 |

OTHER PUBLICATIONS

Japanese Office Action dated Apr. 17, 2009 in corresponding Japanese Application No. 2005-148562.

* cited by examiner

*Primary Examiner*—Matthew B Smithers
(74) *Attorney, Agent, or Firm*—Fitzpatrick, Cella, Harper & Scinto

(57) ABSTRACT

An encrypted document file and related file are received (S42), and character strings are extracted from the related file. The document file is registered in a database (150) together with the extracted character strings (S45).

7 Claims, 16 Drawing Sheets

FIG. 7

DOCUMENT REGISTRATION DIALOG

STORAGE LOCATION ···>CONTRACT DOCUMENT

601 DOCUMENT TO BE REGISTERED
[#129484.doc] [BROWSE...]

DOCUMENT NAME
[          ]

604 RELATED DOCUMENT FILE
[PAMPHLET_XY.doc] [BROWSE...]

COMMENT 606
[FOR INTERNAL USE ONLY]

USER INDEX

NETWORK : [MAINTENANCE SERVICE] ~607

HARDWARE : [          ]

SOFTWARE : [          ]

CONTRACT TYPE : [YEARLY] ~610

DUE DATE : [          ]

612
(EXECUTION) (CANCEL)

FIG. 8

NETWORK MAINTENANCE SERVICE CONTRACT

SECTION 1 (TENOR)

ABC CORPORATION ("FIRST PARTY") CONCLUDED MAINTENANCE SERVICE CONTRACT FOR MAINTENANCE AND REPAIR OF HARDWARE AND SOFTWARE ("SYSTEM") ON ATTACHED SHEETS AND NETWORK WITH XY SYSTEMS ("SECOND PARTY") ACCORDING TO ARTICLES OF THIS CONTRACT DOCUMENT

SECTION 2 (MAINTENANCE SERVICE CHARGE)

THE MAINTENANCE SERVICE CHARGE WITHOUT THE CONSUMPTION TAX SHALL BE ¥2,500,000 PER MONTH. THE SECOND PARTY SHALL PAY THE MAINTENANCE SERVICE CHARGE AND CONSUMPTION TAX TO THE BANK ACCOUNT DESIGNATED BY THE FIRST PARTY BEFORE START OF THE MAINTENANCE SERVICE TOGETHER WITH COMMISSION, AND THE MAINTENANCE SERVICE CHARGE AND CONSUMPTION TAX PAID BY THE SECOND PARTY TO THE FIRST PARTY SHALL NOT BE RETURNABLE TO THE SECOND PARTY EVEN IN THE EVENT OF CANCELLATION UNDER SECTION 12 OR MIDTERM CANCELLATION

SECTION 3 (MAINTENANCE SERVICE START DATE)

THE MAINTENANCE SERVICE UNDER THIS CONTRACT SHALL START FROM APRIL 1, 2003

FIG. 9

```
MIIDtDCCA16gAwIBAgIQczrcs8xR2BSwdEE+9xnjmDANBgkqhkiG9w0BAQQF
ADCBqTEWMBQGA1UEChMNVmVyaVNpZ24slEluYzFHMEUGA1UECxM+d3d
3LnZlcmlzaWdu
LmNvbS9yZXBvc210b3J5LlRlc3RDUFMgSW5jb3JwLiBCeSBSZWYulExpYWIu
ExURC4xRjBEBgNVBAsTPUZvciBWZXJpU2InbiBhdXRob3JpemVklHRlc3Rpbm
cgb25seS4gTm8gYXNzdXJhbmNlcyAoQylWUzE5OTcwHhcNMDMwNDAzMDAw
MDAwWhcNMDMwNDE3MjM1OTU5WjBmMQswCQYDVQQGEwJKUDERMA8
GA1UECBMIS2FuYWdhd2ExETAP
BgNVBAcUCG5ha2FoYXJhMQ4wDAYDVQQKFAVDQU5PTjEOMAwGA1UECx
QFRFMyMjMx
ETAPBgNVBAMUCGNiYXNwMDJzMIGfMA0GCSqGSIb3DQEBAQUAA4GNAD
CBiQKBgQDOLCdYeBOt7OR0R6RJMjUPF/gDmJPwbfQvXpmLSX5ARFuYKc+u
L/E0u7ykGs4YJqpQKiXbY0EOcu7rSpxCNI+hyKlBFxwvoiFpiETwV3hYR8Fmlz
n4rxu4V/ab5Aq5MHSp
N6XathpJscE3Y5ZeOHXbv0ovg7/Lfw28kp0x9hrAGwIDAQABo4lBXjCCAVowCQ
YD
VR0TBAIwADALBgNVHQ8EBAMCBaAwPAYDVR0fBDUwMzAxoC+gLYYraHR0
cDovL2Ny
bC52ZXJpc2lnbi5jb20vUlNBU2VjdXJlU2VydmVyLmNybDCBrAYDVR0gBIGkMI
Gh
MIGeBgtghkgBhvhFAQcBATCBjjAoBggrBgEFBQcCARYcaHR0cHM6Ly93d3cud
mVy
aXNpZ24uY29tL0NUUzBiBggrBgEFBQcCAjBWMBUWDIZlcmlTaWduLCBJbm
MuMAMCAQEaPVZlcmlTaWduJ3MgQ1BTIGluY29ycC4gYnkgcmVmZXJlbmNll
GxpYWIulGx0ZC4gKGMpOTcgVmVyaVNpZ24wHQYDVR0lBBYwFAYIKwYBBQ
UHAwEGCCsGAQUFBwMC
MDQGCCsGAQUFBwEBBCgwJjAkBggrBgEFBQcwAYYYaHR0cDovL29jc3Audm
VyaXNp
Z24uY29tMA0GCSqGSIb3DQEBBAUAA0EAqvm10SJegRkeD96BqbUx3RHJJtn
KnZAT
BCImV4ZqKv4XeNiFzdRtd7AqDRo9e/UBWWqHmiZvwlGhpVYqUwW7WA==
```

FIG. 12

| INDEX | POSITION |
|---|---|
| XY SYSTEMS | xxx |
| COMPANY | ... |
| NETWORK | ... |
| SUPPORT | ... |
| US | |
| CONTACT | |
| EXAMPLE | |
| INTERNET | |
| ROUTER | |
| DATABASE | |
| RAID | |
| BACKUP SERVER | |
| ESTIMATION | |
| FREE | |
| FOLLOWING NUMBER | |
| TELEPHONE | |

FIG. 15

| ATTRIBUTE SEARCH DIALOG | | |
|---|---|---|
| FOLDER NAME : | | |
| FOLDER ADMINISTRATOR : | | |
| FOLDER CREATOR : | | |
| DATE OF CREATION OF FOLDER : | | |
| DATE OF UPDATE OF FOLDER : | | |
| FOLDER SIZE : | | |
| DISCARD TIME LIMIT : | | |
| NETWORK : | MAINTENANCE SERVICE | -OPTION- ▼ |
| HARDWARE : | | -OPTION- ▼ |
| SOFTWARE : | | -OPTION- ▼ |
| CONTRACT TYPE : | YEARLY | -OPTION- ▼ |

. . . .

( SEARCH )   ( CANCEL )

SERVER APPARATUS AND CONTROL METHOD

FIELD OF THE INVENTION

The present invention relates to a technique for managing files.

BACKGROUND OF THE INVENTION

In recent years, digital documents have been actively shared and distributed via networks such as the Internet or the like. However, since a size limitation is imposed to attach such document to e-mail, a shared document server is set to exchange files based on folder configurations corresponding to companies and organizations that use the server. With this server, documents required for business are shared and distributed using functions of uploading, copying, downloading, and so forth of documents.

However, since data exchange on the Internet is unsure in terms of security, it is desirable to encrypt the contents of documents upon transmitting secret information of a company. For this purpose, when a document is uploaded to an external document management server via the Internet, it is a common practice that the user who wants to transmit the document encrypts the contents of that document by executing an encryption program to the document on a client machine, and then stores the encrypted document in the server.

On the other hand, in order to implement a so-called full-text search which is conducted by designating words that appear in body text of documents so as to meet needs for searching documents stored in the server later, document contents must be scanned in advance to perform language analysis to generate indices. However, the contents of documents which have been encrypted and uploaded by the users cannot be browsed, and it is impossible to generate indices. Hence, Japanese Patent Laid-Open No. 2000-011001 discloses a technique for temporarily decrypting encrypted documents to plaintext to generate search keywords in a server. However, in Japanese Patent Laid-Open No. 2000-011001, since documents are decrypted to plaintext in the server, such technique does not suffice to hide documents from the eyes of the server management agent.

A method of conducting an attribute search by designating various attributes of documents is available. Attributes of documents include a document name, URL, comment, creator, date and time of creation, date and time of update, date and time of access, size, parent folder name, and a user index such as an access right or the like. Some of these attributes are automatically assigned by the system, and some others are manually input by the user.

The user index can be freely set by the user to characterize a document upon registering the document. In the attribute search, a target document can be retrieved by arbitrarily combining these attributes.

However, the attribute search is not adequate to conduct a search using contents written in documents. In consideration of convenience at the time of search, sufficient and appropriate user indices must be manually added upon registration, thus imposing a load on the user.

As described above, since Japanese Patent Laid-Open No. 2000-011001 has a mechanism for decrypting documents into plaintext in the server, it does not suffice to hide documents from the eyes of the server management agent. Also, with the attribute search, the user must individually and manually input appropriate user indices upon registration of documents, thus increasing the load on the user.

SUMMARY OF THE INVENTION

The present invention has been made in consideration of the above problems, and has as its object to provide a technique for registering an encrypted file to be searchable using a character string included in the contents of that file.

In order to achieve an object of the present invention, for example, a server apparatus of the present invention comprises the following arrangement.

That is, a server apparatus characterized by comprising:

extraction means for extracting a character string from a non-encrypted first file; and registration means for registering the character string extracted by the extraction means in a database as information used to search for an encrypted second file, wherein the encrypted second file is obtained by encrypting a file which is not encrypted and is different from the first file.

In order to achieve an object of the present invention, for example, a server apparatus of the present invention comprises the following arrangement.

That is, a server apparatus characterized by comprising:

extraction means for extracting a character string from a non-encrypted first file; and registration means for registering the character string extracted by the extraction means in a database as information used to search for a third file obtained by encrypting a non-encrypted second file, wherein the first file is different from the second file.

In order to achieve an object of the present invention, for example, a method of controlling a server apparatus of the present invention comprises the following arrangement.

That is, a method of controlling a server apparatus, characterized by comprising:

an extraction step of extracting a character string from a non-encrypted first file; and a registration step of registering the character string extracted in the extraction step in a database as information used to search for an encrypted second file, wherein the encrypted second file is obtained by encrypting a file which is not encrypted and is different from the first file.

In order to achieve an object of the present invention, for example, a method of controlling a server apparatus of the present invention comprises the following arrangement.

That is, a method of controlling a server apparatus, characterized by comprising:

an extraction step of extracting a character string from a non-encrypted first file; and a registration step of registering the character string extracted in the extraction step in a database as information used to search for a third file obtained by encrypting a non-encrypted second file, wherein the first file is different from the second file.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 shows a display example of the document registration GUI when a document file, related file, and other kinds of information are input using the GUI shown in FIG. 6;

FIG. 8 shows the contents of a document file having a file name "#129484.doc";

FIG. 9 shows the contents of an encrypted document file;

FIG. 12 shows a configuration example of a table that manages character strings extracted in step S44;

FIG. 15 shows a display example of a GUI used to search document files using a user index as a key.

DETAILED DESCRIPTION OF THE PREFERRED EMBODIMENT

A preferred embodiment of the present invention will now be described in detail in accordance with the accompanying drawings.

<System of Embodiment>

Figure 1:
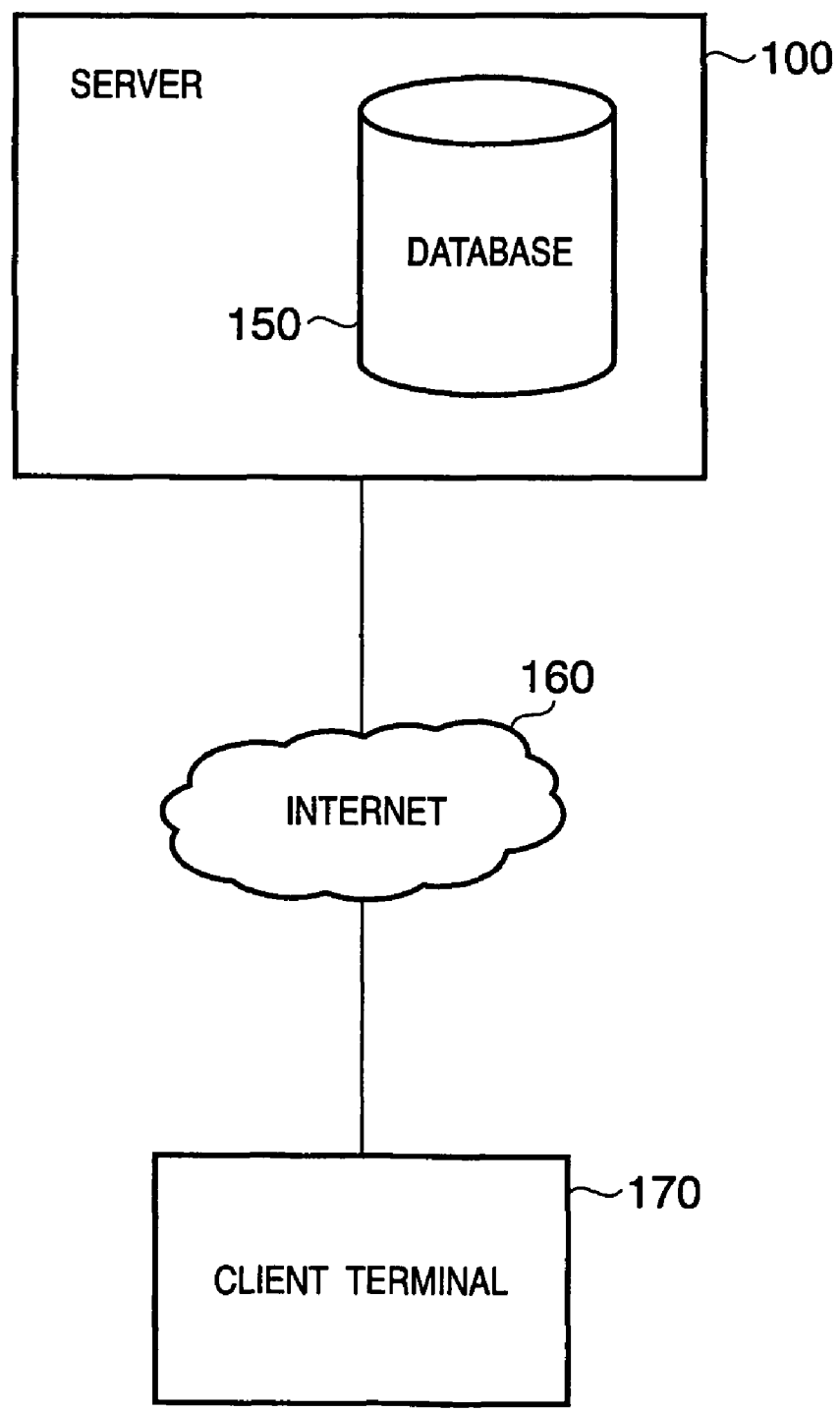
FIG. 1 is a view showing the basic arrangement of a system according to an embodiment of the present invention.

FIG. 1 is a view showing the basic arrangement of a system according to an embodiment. As shown in FIG. 1, the system according to this embodiment comprises a server 100 and client terminal 170, which make data communications with each other via an Internet 160. The server 100 comprises a database 150 which is used to register and manage files transmitted from the client terminal 170. In the following description, assume that files to be registered in the database 150 are document files.

Figure 2:
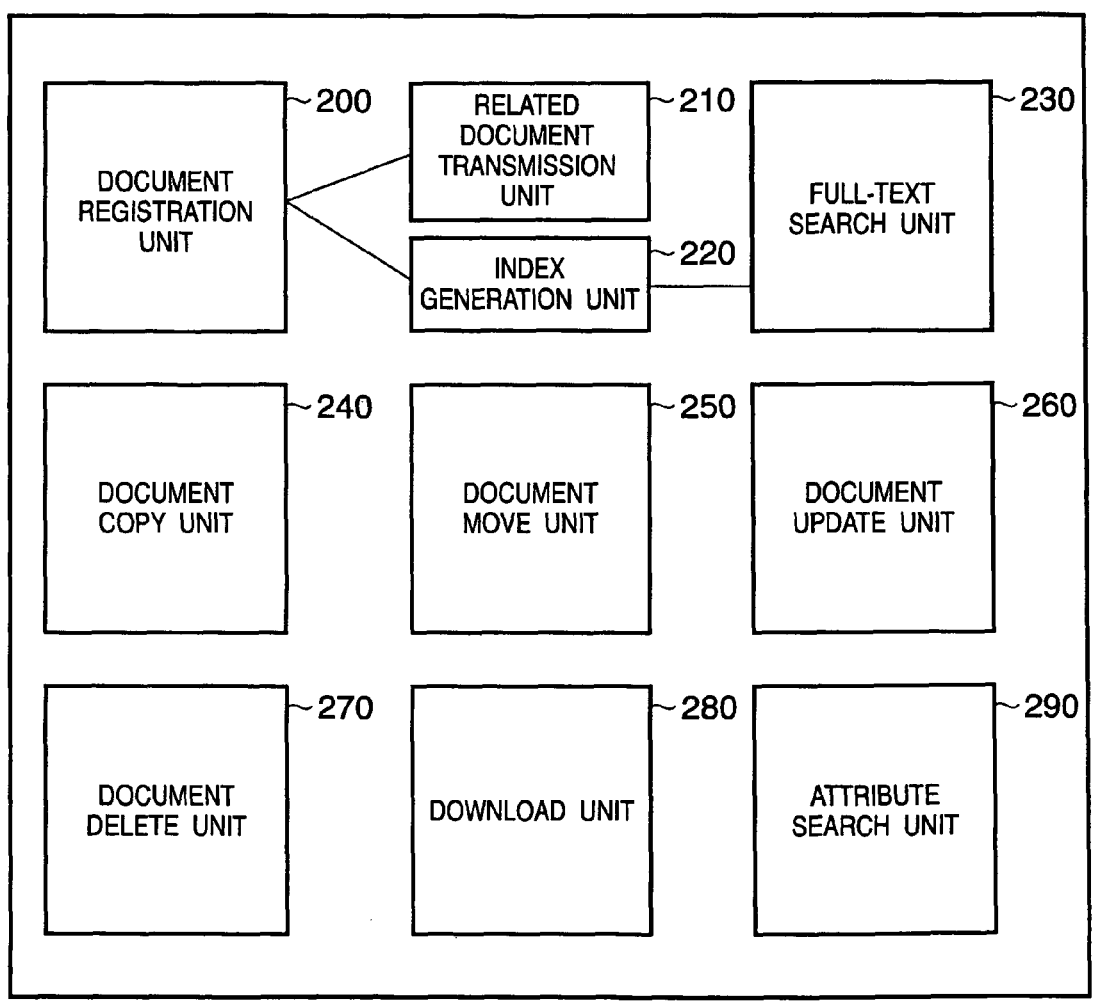
FIG. 2 is a block diagram showing the functional arrangement of the system according to the embodiment of the present invention.

FIG. 2 is a block diagram showing the functional arrangement of the system according to this embodiment.

A document registration unit 200 executes processing for registering a document file, which is transmitted from the client terminal 170 to the server 100 via the Internet 160, in the database 150 of the server 100.

A related document transmission unit 210 executes processing for transmitting, to the database 150, a related file which is selected by the operator of the client terminal 170 in addition to the document file to be registered.

An index generation unit 220 executes processing for extracting character strings from the related file and registering them as indices of the document file in the database 150. These indices are used upon conducting a full-text search.

A full-text search unit 230 executes processing for searching document files registered in the database 150 using, as keys and indices, character strings designated by the operator of the client terminal 170.

A document delete unit 270 executes processing for deleting a document file designated by the operator of the client terminal 170 of those registered in the database 150.

A document update unit 260 executes processing for updating the contents or attributes of a document file registered in the database 150. The document update unit 260 comprises a check-in/check-out function to execute exclusive control so as to prevent a document file from being updated by another operator simultaneously when that document is being updated by a given operator.

A document move unit 250 executes processing for moving a document file designated by the operator of the client terminal 170 of those registered in the database 150 to a storage location designated by that operator (e.g., another storage location (another folder) in the database 150).

A download unit 280 executes processing for downloading, to the client terminal 170, a document file designated by the operator of the client terminal 170 of those registered in the database 150.

A document copy unit 240 executes processing for copying a document file designated by the operator of the client terminal 170 of those registered in the database 150 to a storage location designated by that operator (e.g., another storage location (another folder) in the database 150).

An attribute search unit 290 executes processing for searching for target document files and folders using, as keys, various attributes of document files or folders that register the document files, which are designated by the operator of the client terminal 170.

Various attributes of document files and folders which register the document files include a document name, URL, comment, creator, date and time of creation, date and time of updating, date and time of access, size, parent folder name, access right, various user indices, and the like. Also, attributes unique to folders include a discard time limit setting, update notification setting, and the like. Some of these attributes are automatically assigned by the system, and some others are manually input by the operator upon registration of a document file. The user index can be freely assigned as needed upon registration of a document file or later. As the user index, arbitrary character strings can be input within the range of a form defined in advance by a management user.

Figure 16:
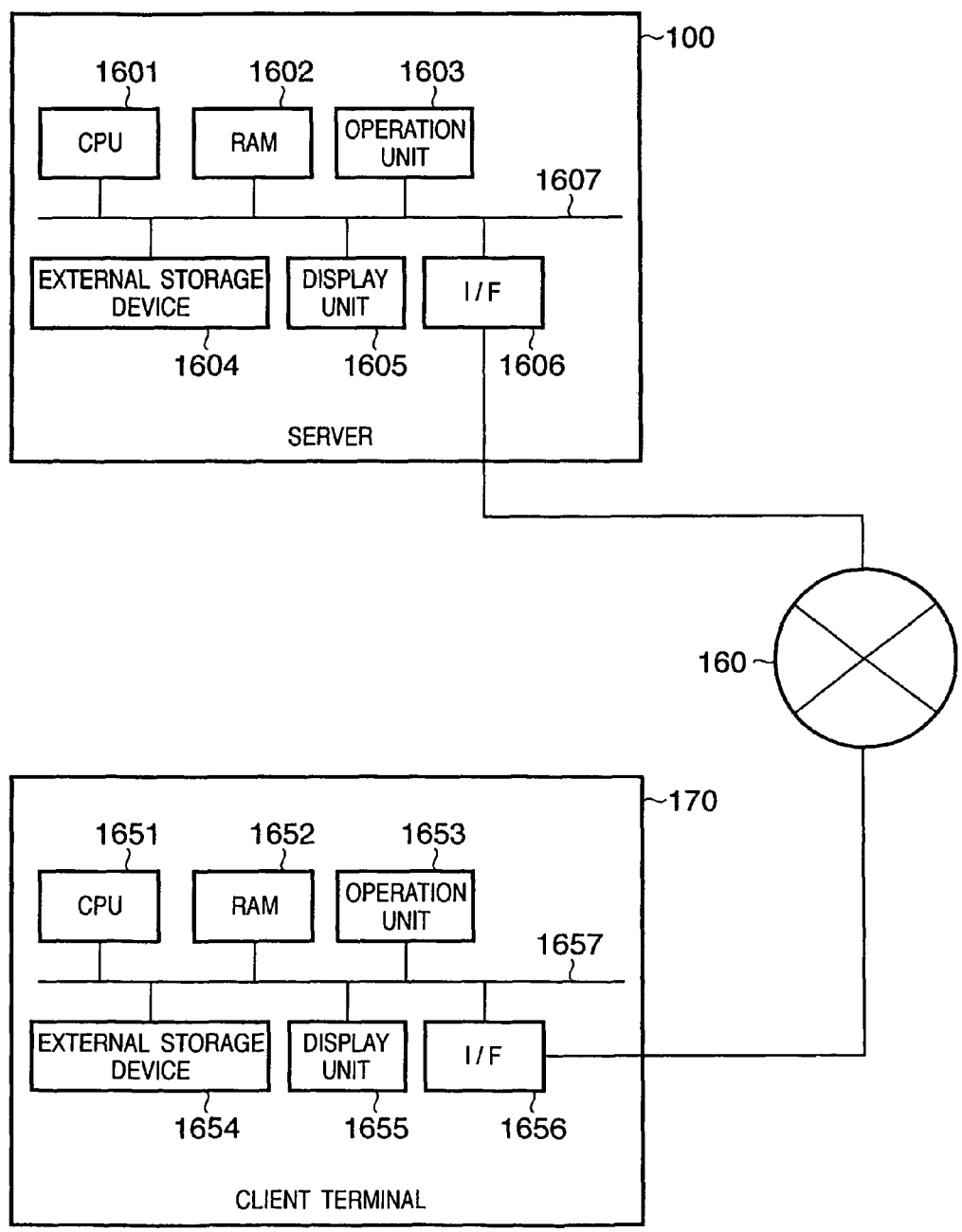
FIG. 16 is a block diagram showing the basic hardware arrangements of the server 100 and client terminal 170.

FIG. 16 is a block diagram showing the basic hardware arrangements of the server 100 and client terminal 170. Note that the hardware arrangements of the server and client terminal are not limited to such specific arrangements, and various other arrangements may be used.

The hardware arrangement of the terminal 170 will be described below. As shown in FIG. 16, the terminal 170 comprises a CPU 1651, RAM 1652, operation unit 1653, external storage device 1654, display unit 1655, and I/F 1656.

The CPU 1651 controls the overall client terminal 170 using programs and data loaded onto the RAM 1652, and executes respective processes (to be described later) to be executed by the client terminal 170.

The RAM 1652 can provide various areas such as an area for temporarily storing programs and data loaded from the external storage device 1654, an area used when the CPU 1651 executes various kinds of processing, and the like.

The operation unit 1653 comprises a keyboard, mouse, and the like. When the operator of the client terminal 170 operates the operation unit 1653, he or she can input various instructions to the CPU 1651.

The external storage device 1654 is a large-capacity information storage device represented by a hard disk drive device, which saves an OS (operating system), and programs and data for making the CPU 1651 execute respective processes (to be described later) to be executed by the client terminal 170. Some or all of these programs and data are loaded onto the RAM 1652 under the control of the CPU 1651, and are to be processed by the CPU 1651.

The display unit 1655 comprises a CRT, liquid crystal display, or the like, and displays processing results of the CPU 1651 by means of images, text, and the like.

The I/F 1656 serves as an interface for connecting the client terminal 170 to the Internet 160. The client terminal 170 makes data communications with the server 100 via this I/F 1656.

Reference numeral 1657 denotes a bus which interconnects the aforementioned units.

The hardware arrangement of the server 100 will be described below. As shown in FIG. 16, the server 100 comprises a CPU 1601, RAM 1602, operation unit 1603, external storage device 1604, display unit 1605, and I/F 1606.

The CPU 1601 controls the overall server 100 using programs and data loaded onto the RAM 1602, and executes respective processes (to be described later) to be executed by the server 100.

The RAM 1602 can provide various areas such as an area for temporarily storing programs and data loaded from the external storage device 1604, an area for temporarily storing data received via the I/F 1606, an area used when the CPU 1601 executes various kinds of processing, and the like.

The operation unit 1603 comprises a keyboard, mouse, and the like. When the operator of the server 100 operates the operation unit 1603, he or she can input various instructions to the CPU 1601.

The external storage device 1604 is a large-capacity information storage device represented by a hard disk drive device, which saves an OS (operating system), and programs and data for making the CPU 1601 execute respective processes (to be described later) to be executed by the server 100. Some or all of these programs and data are loaded onto the RAM 1602 under the control of the CPU 1601, and are to be processed by the CPU 1601. The database 150 is assured in the external storage device 1604.

The display unit 1605 comprises a CRT, liquid crystal display, or the like, and displays processing results of the CPU 1601 by means of images, text, and the like.

The I/F 1606 serves as an interface for connecting the server 100 to the Internet 160. The server 100 makes data communications with the client terminal 170 via this I/F 1606.

Reference numeral 1607 denotes a bus which interconnects the aforementioned units.

<Processing to be Executed by Client Terminal 170 Upon Registering Document File>

Figure 3:
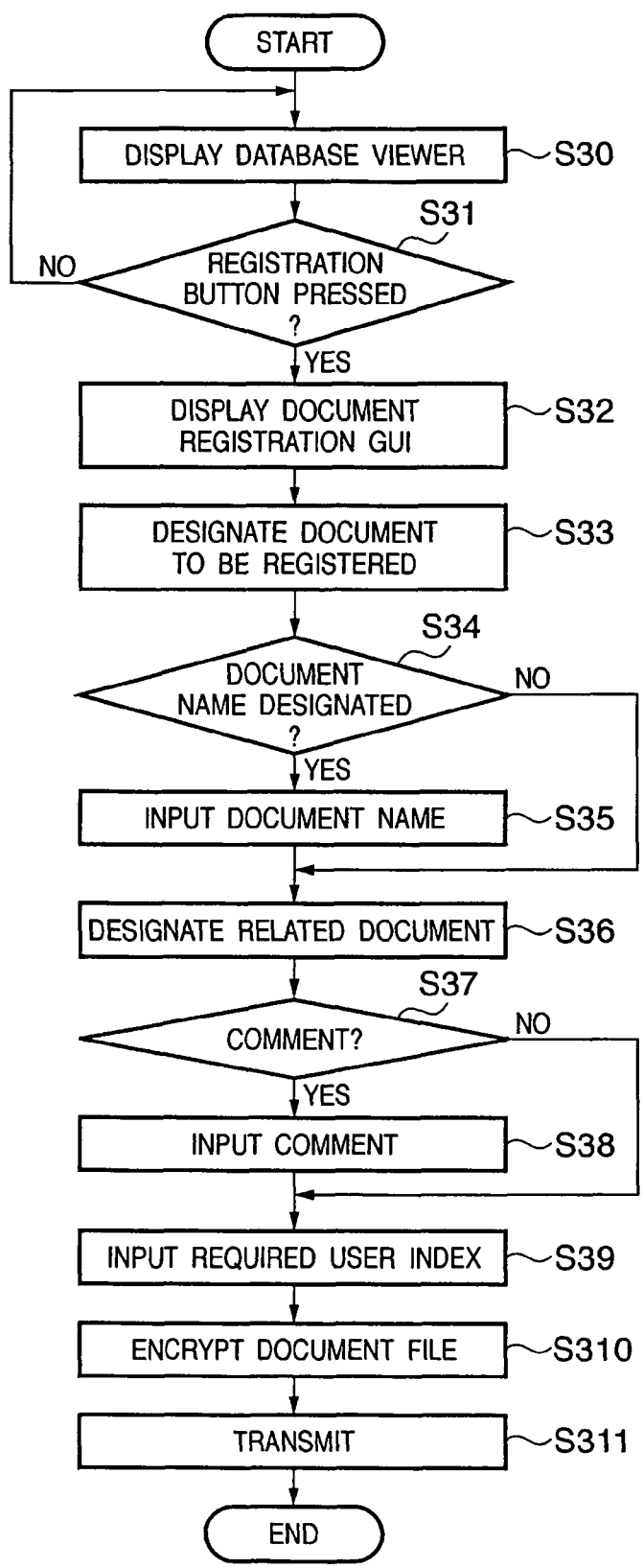
FIG. 3 is a flowchart of the processing to be executed by a client terminal 170 to select a document file to be registered in a server 100 and to transmit the selected document to the server 100.

Next, the processing to be executed by the client terminal 170 to select a document file to be registered in the server 100 and to transmit the selected document file to the server 100 will be described below using FIG. 3 which is the flowchart of that processing. Note that the program and data for making the CPU 1651 execute the processing according to the flowchart of FIG. 3 are saved in the external storage device 1654, and are loaded onto the RAM 1652 as needed under the control of the CPU 1651. When the CPU 1651 performs processing using the loaded program and data, the client terminal 170 executes the processing to be described below.

When the operator of the client terminal 170 inputs an operation for displaying a GUI (database viewer) used to register a document file in the server 100 on the display screen of the display unit 1655 using the operation unit 1653, the CPU 1651 detects this operation, and starts the processing according to the flowchart of FIG. 3. The CPU 1651 displays the database viewer on the display screen of the display unit 1655 first (step S30).

Figure 5:
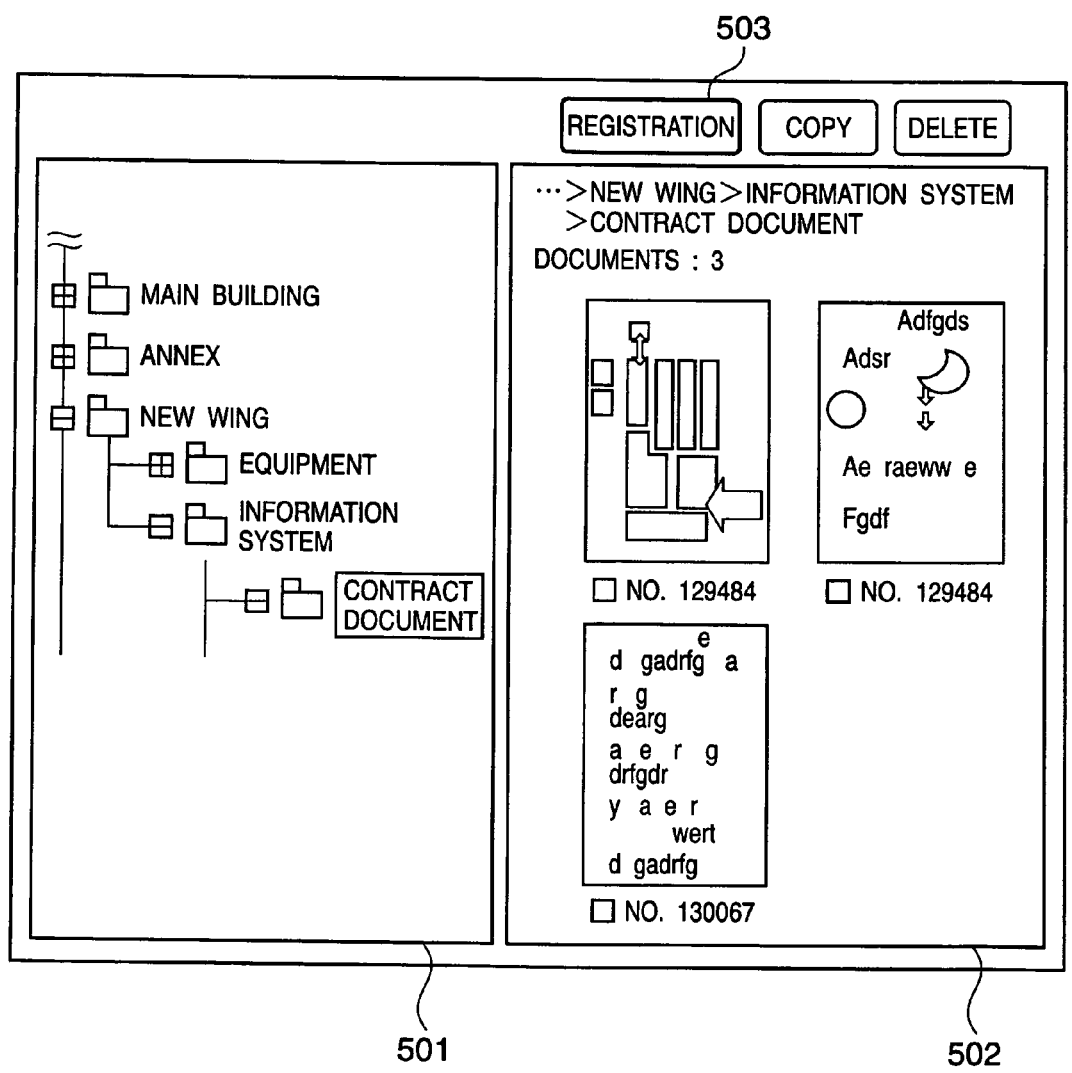
FIG. 5 shows a display example of a database viewer.

FIG. 5 shows a display example of the database viewer. As shown in FIG. 5, the database viewer comprises an area 501 for displaying a directory configuration in the database 150 in the external storage device 1604 of the server 100 in a tree format, an area 502 for displaying, together with check boxes, icons indicating files stored in a folder currently selected on the area 501, and a registration button 503.

Note that a series of operations for designating a desired one of folders displayed on the area 501, and displaying a list of files stored in the desired folder on the area 502 are implemented by a popularly used operation method, and a description thereof will be omitted.

Hence, in step S30 upon reception of a display instruction of the database viewer, the CPU 1651 accesses the server 100 to acquire the directory configuration in the database 150 and displays the acquired directory configuration on the area 501. When a folder is designated on the area 501, the CPU 1651 acquires file information (file names, attributes, and the like) stored in the designated folder and displays a list of the acquired information on the area 502.

Note that the display format of the directory configuration in the external storage device 1604 is not limited to the tree format, but various other formats may be used. Also, file names and file attributes may be displayed on the area 502 in place of the icons. In any case, each file information (icon, file name, attribute, and the like) is displayed together with the check box.

In this embodiment, a document file is registered in the currently designated folder (i.e., it is registered in the same folder as that of the files displayed on the area 502). Hence, when the operator of the client terminal 170 designates the registration button 503 using the operation unit 1653, the CPU 1651 detects it, and controls the flow to advance to step S32 via step S31 so as to display a GUI (document registration GUI) shown in FIG. 6 on the display screen of the display unit 1655 (step S32).

Figure 6:
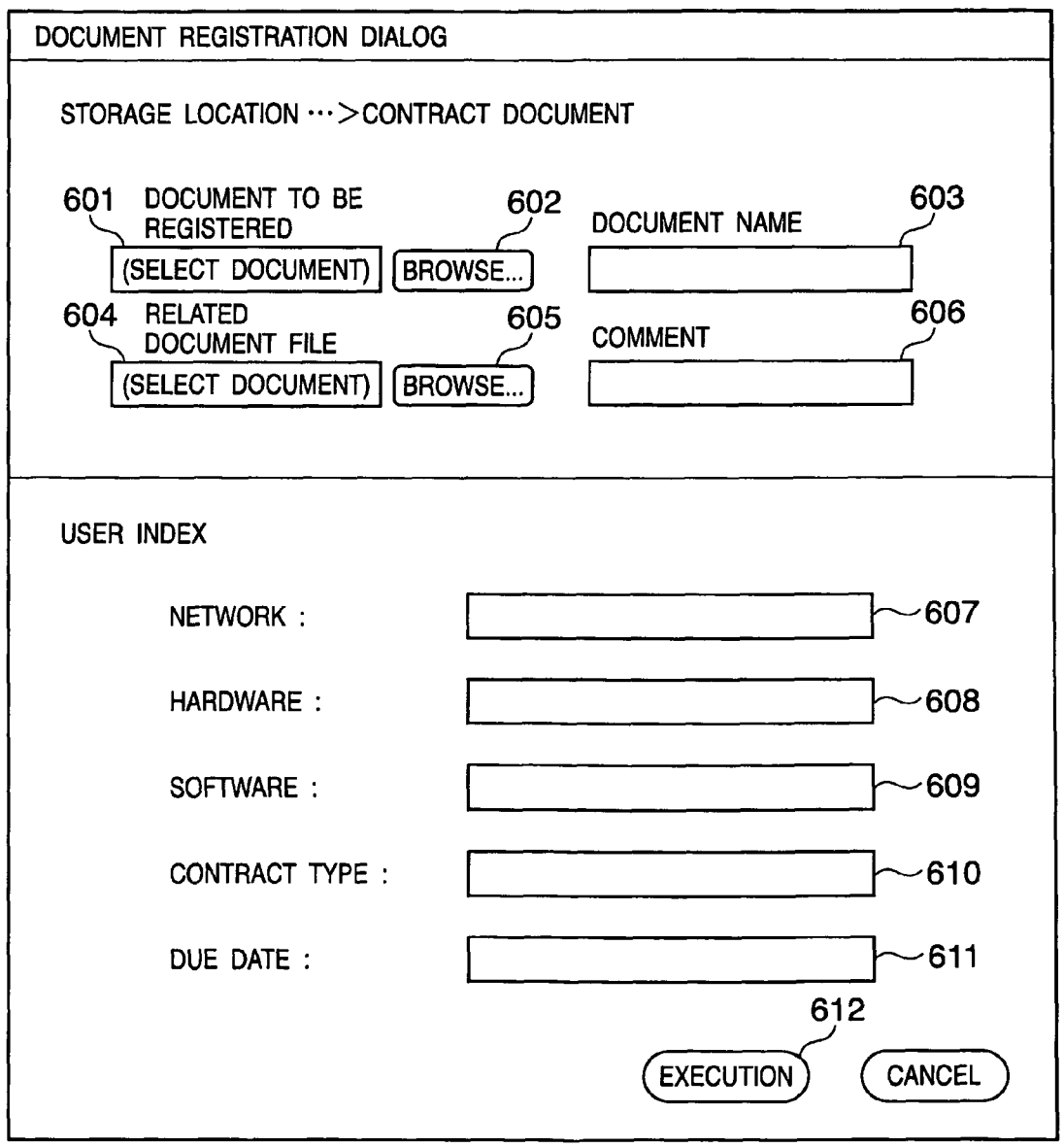
FIG. 6 shows a display example of a document registration GUI.

FIG. 6 shows a display example of the document registration GUI. A field 601 is used to input the file name of a document file to be registered in the database 150, and allows the operator of the client terminal 170 to input the file name using the operation unit 1653. A document file having the file name input to this field 601 is designated as one which is to be registered in the database 150.

Note that another method of designating a document file to be registered in the database 150 is available. When the operator designates a "browse" button 602 using the operation unit 1653, the CPU 1651 detects it, and displays, on the display screen of the display unit 1655, a list of document files saved in the external storage device 1654 and those which are held by devices that can be accessed by the client terminal 170. Hence, when the operator designates a desired document file from the displayed list using the operation unit 1653, the file name of the designated document file is displayed in the field

601. Note that the method of designating a document file to be registered in the database 150 is not limited to this.

Hence, referring back to FIG. 3, the operator of the client terminal 170 designates the document file to be registered in the database 150 by a given operation, e.g., by directly inputting the file name of a document file to be registered in the database 150 in the field 601 using the operation unit 1653, by designating the document file to be registered in the database 150 from the list displayed upon pressing the "browse" button 602 using the operation unit 1653, or the like. Then, the CPU 1651 detects this operation, and displays the file name of the designated document file in the field 601 (step S33).

When the operator performs an operation for inputting the document name in a field 603 using the operation unit 1653, the CPU 1651 detects this operation, and controls the flow to advance to step S35 via step S34 so as to display the input document name in the field 603 (step S35). Note that the document name input is not indispensable. Hence, when nothing is designated in the document name field, the CPU 1651 displays, in the field 603, a part obtained by excluding an extension from the file name displayed in the field 601.

Next, the operator of the client terminal 170 designates a file (to be referred to as a related file hereinafter) related to the document file to be registered (to be referred to as a registration document file hereinafter).

Since the registration document file is encrypted when it is registered in the database 150, character strings in this document file become unreadable after registration, as described above. Therefore, this document file cannot be searched for using character strings included in the description contents of this document file as keys.

Therefore, in this embodiment, the operator selects, as the related file, a file which is related to this document file in terms of contents. Since some character strings common to the document file are described in this related file, the server 100 extracts these character strings, and registers the extracted character strings as full-text search indices in the database 150 together with the document file. In this way, when this document file is searched for using character strings described in the document file, the character strings which are registered together with the document file (those which are extracted from the related file) can be used. As a result, the document file can be searched for using the character strings described in the document file.

In FIG. 6, a field 604 is used to input the file name of the related file to be registered in the database 150, and allows the operator of the client terminal 170 to input the file name using the operation unit 1653.

Note that another method of designating the related file is available. When the operator designates a "browse" button 605 using the operation unit 1653, the CPU 1651 detects it, and displays, on the display screen of the display unit 1655, a list of related files saved in the external storage device 1654 and those which are held by devices that can be accessed by the client terminal 170. Hence, when the operator designates a desired related file from the displayed list using the operation unit 1653, the file name of the designated related file is displayed in the field 604. Note that the method of designating the related file is not limited to this.

Hence, referring back to FIG. 3, the operator of the client terminal 170 designates the related file by a given operation, e.g., by directly inputting the file name of the related file in the field 604 using the operation unit 1653, by designating the related file from the list displayed upon pressing the "browse" button 605 using the operation unit 1653, or the like. Then, the CPU 1651 detects this operation, and displays the file name of the designated related file in the field 604 (step S36).

Next, when the operator of the client terminal 170 makes an operation for inputting a comment in a field 606 using the operation unit 1653, the CPU 1651 detects this operation and controls the flow to advance to step S38 via step S37, thus displaying the input command in a field 606 (step S38).

In order to also allow search using attribute information of a document file, the operator can input user index items defined in advance by a management user in fields 607 to 611 within the range of a predetermined form. Hence, when the operator of the client terminal 170 makes an input operation in these fields using the operation unit 1653, the CPU 1651 detects it, and displays the input information in the corresponding fields (step S39).

FIG. 7 shows a display example of the document registration GUI when the document file, related file, and other kinds of information are input using the GUI shown in FIG. 6. On the GUI shown in FIG. 7, a document file having a file name "#129484.doc" is designated as the document file, as shown in the field 601. FIG. 8 shows the contents of the document file having the file name "#129484.doc". As shown in FIG. 7, this document file is that of a contract document which describes the contents of contract that a company named ABC Corporation concludes with a company named XY Systems.

Figure 10:
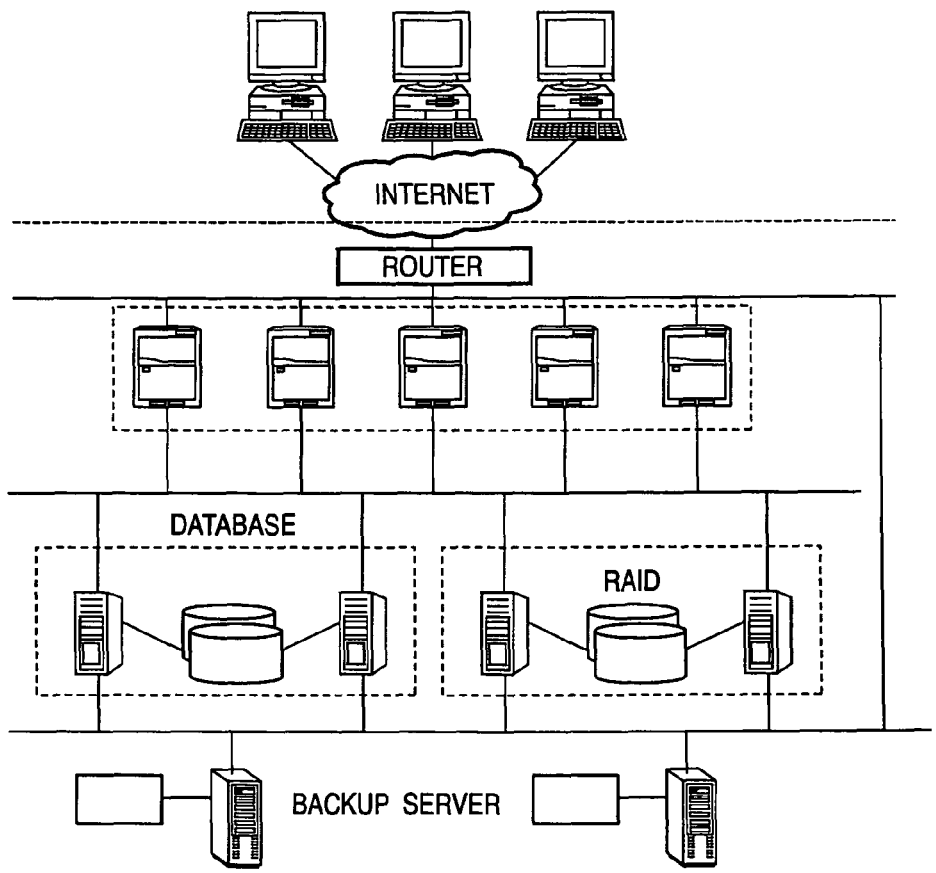
FIG. 10 shows the contents of a related file having a file name "pamphlet_XY.doc"

On the GUI shown in FIG. 6, a related file having a file name "pamphlet_XY.doc" is designated as the related file, as shown in the field 604. FIG. 10 shows the contents of the related file having the file name "pamphlet_XY.doc". As shown in FIG. 10, this related file is a promotional pamphlet of the company named XY Systems. This pamphlet includes some of character strings described in the document file shown in FIG. 8. Therefore, by selecting the related file which is related to the document file, both the files have the same character strings.

Note that a file which describes general information is used as the related file unlike the document file (contract document) with high confidentiality. That is, since the character strings described in such related file do not have any confidentiality unlike the contents described in the document file, if the character strings described in the related file are used as full-text search indices, the contents described in the document file remain confidential, thus maintaining the confidentiality of the document file.

Referring back to FIG. 7, a character string "for internal use only" is input as a comment in the field 606, and character strings "maintenance service" and "yearly" are respectively input to the fields 607 and 610. Note that items that can be input as user indices are not limited to them. In FIG. 7, since no document name is input, the CPU 1651 inputs, as the document name, a part "#129484" obtained by excluding the extension ".doc" from the file name "#129484.doc" of the document file.

In this way, the document file and related file can be designated, and other kinds of information can be input as needed.

Referring back to FIG. 3, when the operator of the client terminal 170 designates an execution button 612, the CPU 1651 detects this operation, and encrypts the document file (in this embodiment, the document file with "#129484.doc" shown in FIG. 8) with the file name displayed in the field 601 (step S310). FIG. 9 shows the contents of the encrypted document file. As shown in FIG. 9, the contents shown in FIG. 8 cannot be detected from those of the encrypted document file. Note that an encryption algorithm is not particularly limited.

The CPU 1651 transmits the encrypted document file, the related file (in this embodiment, the related file with the file name "pamphlet_XY.doc" shown in FIG. 10) with the file name displayed in the field 604, and various kinds of information input as needed are transmitted to the server 100 (step S311).

<Processing to be Executed by Server 100 Upon Registering Document File>

Figure 4:
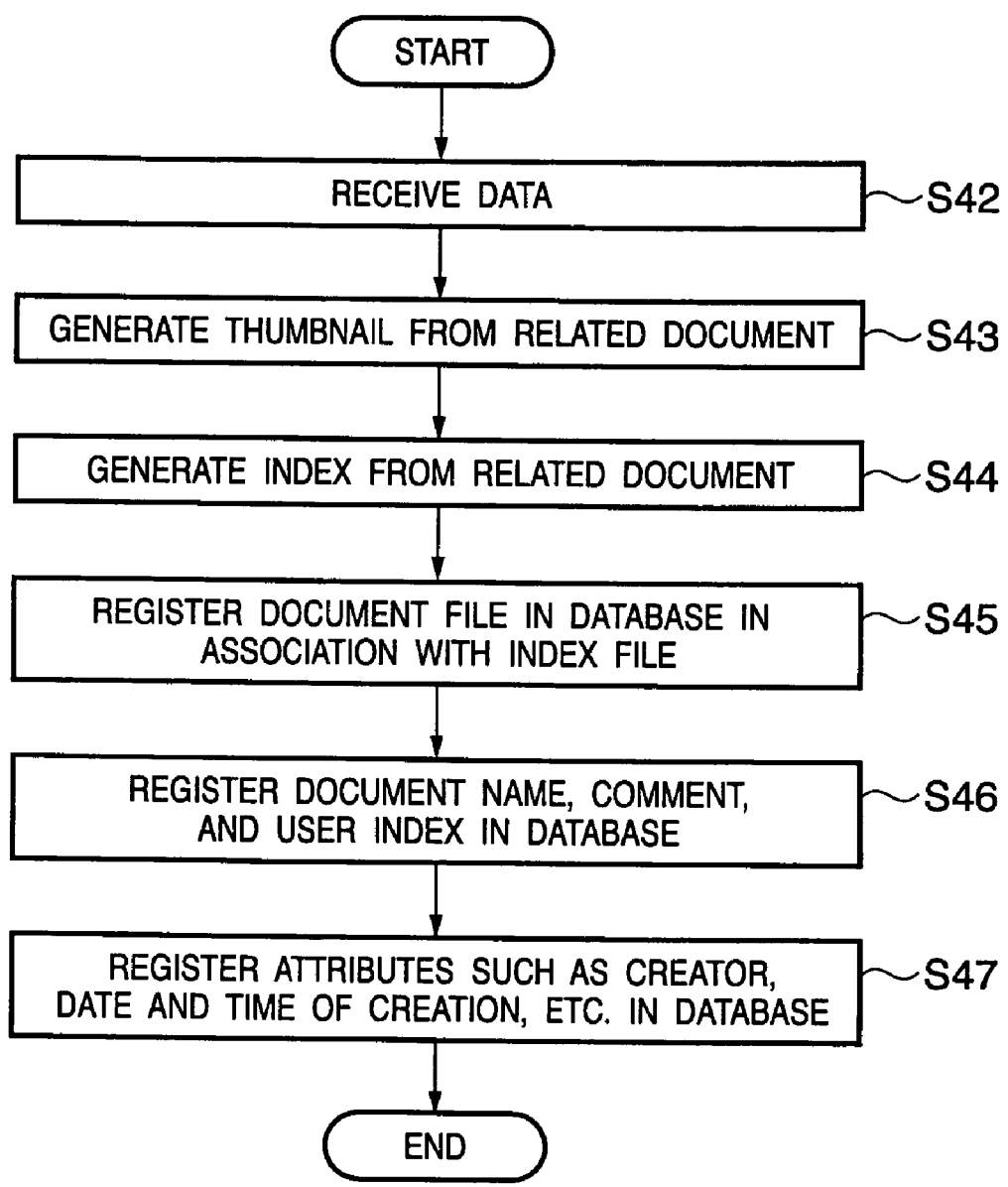
FIG. 4 is a flowchart of the processing to be executed by the server 100 to register, in a database 150, the document file transmitted from the client terminal 170.

The processing to be executed by the server 100 to register the document file transmitted from the client terminal 170 in the database 150 will be described below using FIG. 4 which is the flowchart of that processing. Note that the program and data for making the CPU 1601 execute the processing according to the flowchart of FIG. 4 are saved in the external storage device 1604, and are loaded onto the RAM 1602 as needed under the control of the CPU 1601. When the CPU 1601 performs processing using the loaded program and data, the server 100 executes the processing to be described below.

Upon detection of data transmitted from the client terminal 170, the CPU 1601 temporarily stores the data in the RAM 1602 (step S42). Some data may be stored in the external storage device 1604.

Figure 11:
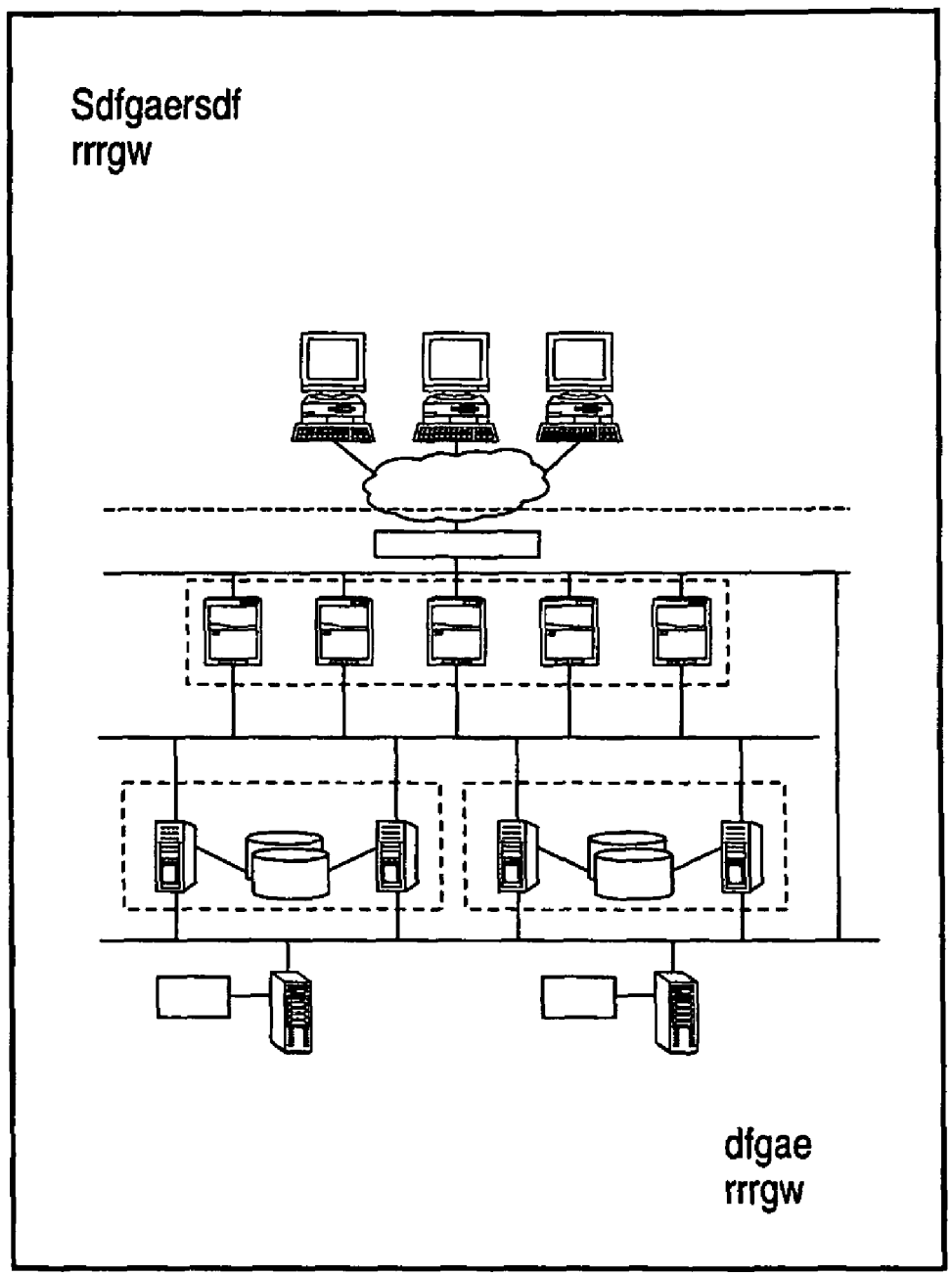
FIG. 11 shows a thumbnail of the related file.

The CPU 1601 generates a thumbnail with reference to the received related file (step S43). FIG. 11 shows a thumbnail of the related file. The thumbnail shown in FIG. 11 is that (reduced-scale image) of the related file shown in FIG. 10. Since a technique for generating a thumbnail of a given file based on the contents of that file is known to those who are skilled in the art, a description thereof will be omitted.

Next, the CPU 1601 extracts character strings included in the related file, and sequentially stored the extracted character strings in the RAM 1602 as full-text search indices (step S44). In this embodiment, since the related file is that shown in FIG. 10, character strings "XY Systems", "company", "network", "supports", "us", "contact", "example", "Internet", "router", "database", "RAID", "backup server", "estimation", "free", and "following number" are extracted, and are sequentially stored in the RAM 1602 as full-text search indices. When the related file is a text file, character strings in the file can be simply extracted. When the related file is an image file which includes images of character strings, the image is recognized by a known technique to specify a text region, and characters in the specified text region are recognized to obtain character strings.

In any case, character strings included in the related file are extracted independently of the type of related file, and the extracted character strings are sequentially stored in the RAM 1602 as full-text search indices in step S44.

FIG. 12 shows a configuration example of a table which manages the character strings extracted in step S44. As shown in FIG. 12, the extracted character strings are managed together with their extraction positions. Hence, the character strings extracted in step S44 are stored in the RAM 1602 in a table format shown in FIG. 12 together with their extraction positions. Note that the management mode of character strings is not limited to this.

In any case, the respective character strings extracted from the related file are held in the RAM 1602 as an index file.

After all character strings are extracted from the related file, since this related file is no longer needed, it may be deleted.

Referring back to FIG. 4, the index file generated in step S44 is registered in the database 150 in association with the encrypted document file received in the RAM 1602 in step S42 (step S45).

Next, when some pieces of information such as the document name, comment, user indices, and the like are input on the client terminal 170 side, since these pieces of information are received in the RAM 1602, they are registered in the database 150 in association with the set registered in step S45 (step S46).

Next, some pieces of information generated by the client terminal 170 such as "the creator of the document file", "the date and time of creation of the document file", and the like transmitted from the client terminal 170 are registered in the database 150 in association with the set registered in step S45 (step S46).

Figure 13:
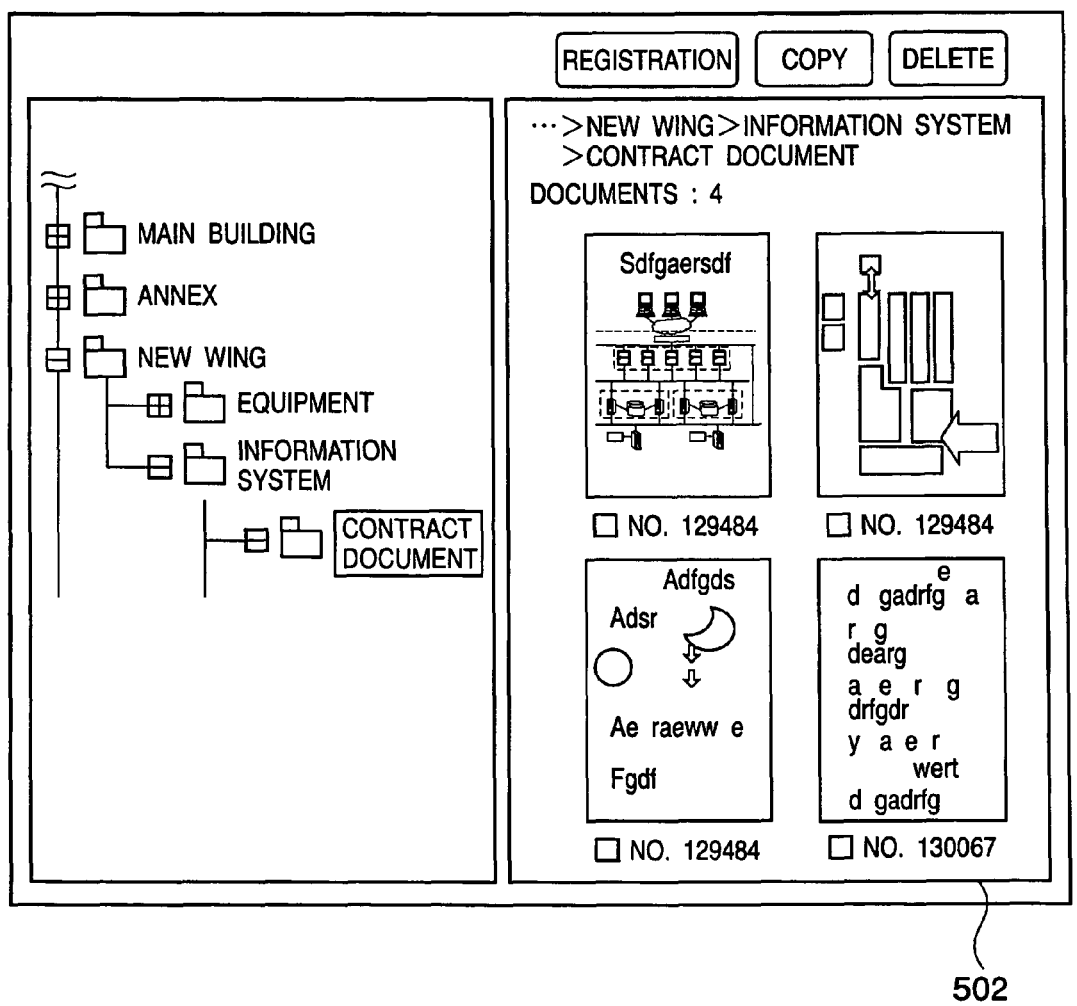
FIG. 13 shows a display example of the database viewer when the document file having the file name "#129484.doc" is registered in a folder "contract document" (a folder designated by the operator of the client terminal 170 as a registration destination of the document file on the GUI in FIG. 5)

FIG. 13 shows a display example of the database viewer when the document file having the file name "#129484.doc" is registered in a folder "contract document" (a folder designated by the operator of the client terminal 170 as a registration destination of the document file on the GUI in FIG. 5) by the above processing. When the state of the database 150 has been updated, the server 100 sends a message that advises accordingly to the client terminal 170. The client terminal 170 updates the display contents of the database viewer in accordance with the contents of this message. Therefore, the icon of the document file having the file name "#129484.doc" added to the folder "contract document" by the above processing is displayed on the area 502. As this icon, the thumbnail generated in step S43 is used.

With the above processing, the document file can be registered in the database 150 to allow a full-text search.

<Search Processing>

A case will be explained below wherein a desired one of document files registered in the database 150 is searched for using character strings described in its contents as keys.

For example, assume that when the operator of the client terminal 170 recognizes the contents of the contract document of the document file having the file name "#129484.doc" but he or she does not know where it is saved, he or she searches for this document file using the client terminal 170.

The contents of the contract document are encrypted and unreadable, as described above. Therefore, when the document file is searched using character strings described in the contents of the desired document file, it cannot be retrieved. Hence, a GUI shown in FIG. 15 is used conventionally to search document files using the user indices as keys. FIG. 15 shows a display example of the GUI used to search document files using user indices as keys. FIG. 15 shows a state wherein "maintenance service" as a value for a user index "network" and "yearly" as a value for a user index "contract type" are input or selected to conduct an attribute search.

Figure 14:
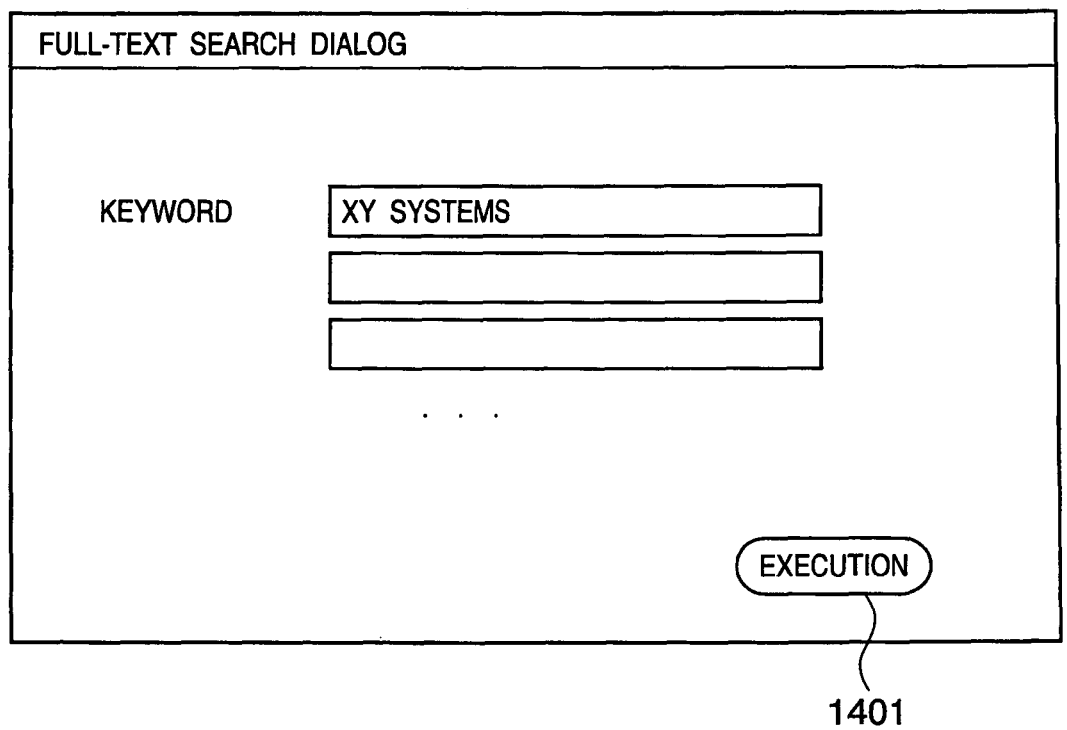
FIG. 14 shows a display example of a GUI used to search document files using the character strings included in the contents of the document file as keys.

On the other hand, in this embodiment, as long as the operator remembers about the contents of the document file, the document file can be searched using the character strings included in its contents as keys. For this purpose, when the operator of the client terminal 170 inputs a search instruction using the operation unit 1653, the CPU 1651 detects this instruction and displays a GUI shown in FIG. 14 on the display screen of the display unit 1655. FIG. 14 shows a display example of a GUI used to search a document file using character strings included in the contents of the document file as keys.

In FIG. 14, a character string "XY Systems" is input as a key (keyword). The character string is input using the operation unit 1653. When the operator designates an "execution" button 1401 using the operation unit 1653, the CPU 1651 detects it, and specifies an index, which matches the character string input as the key, from those which are registered together with the document file registered in the database 150, thus specifying the document file registered in the database 150 in association with the index that matches the character string input as the key.

In case of this embodiment, in order to search for the document file of the contract document, any of character strings described in the pamphlet may be input. Even when memory of the operator of the client terminal 170 is vague, if he or she designates appropriate words that he or she can think of using an OR condition, the document file of the contract document can be retrieved. For example, even when the company name is vague, if the operator designates "RAID", "router", "backup server", and the like, the document file of the contract document can be retrieved.

Note that processing after the document file is specified is not particularly limited. For example, the file name of the specified document file may be displayed on the display screen of the display unit 1655.

As described above, according to this embodiment, even when a document file is encrypted in terms of security, if character strings described in a less confidential file which is related to that document file are registered in association with the document file, that document file can be retrieved using the character strings related to the contents of the encrypted document file as keys, and the need for manually adding user indices can be obviated. For this reason, the load on the user who registers document files can be greatly reduced.

Note that the number of client terminals is one for the sake of simplicity in this embodiment. However, a plurality of client terminals may be connected. In such case, each client terminal executes the same processing as that of the client terminal 170, and the server 100 can execute the same processing for each of these client terminals 170.

In this embodiment, the server 100 and client terminal 170 are connected via the Internet. The type and mode of the network are not limited to them, and data communications may be made between apparatuses via a wired or wireless LAN.

The objects of the present invention are also achieved by supplying a recording medium (or storage medium), which records a program code of a software program that can implement the functions of the above-mentioned embodiments to the system or apparatus, and reading out and executing the program code stored in the recording medium by a computer (or a CPU or MPU) of the system or apparatus. In this case, the program code itself read out from the recording medium implements the functions of the above-mentioned embodiments, and the recording medium which stores the program code constitutes the present invention.

The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the recording medium is written in a memory of the extension card or unit.

When the present invention is applied to the recording medium, that recording medium stores program codes corresponding to the aforementioned flowcharts.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-148562, filed May 20, 2005, which is hereby incorporated by reference herein in its entirety.

What is claimed is:

1. A server apparatus comprising:
    extraction means for extracting a character string from a non-encrypted first file;
    registration means for registering the character string extracted by said extraction means in a database as information used to search for an encrypted second file; and
    deletion means for deleting the non-encrypted first file after said extraction means extracts the character string from the non-encrypted first file,
    wherein the encrypted second file is obtained by encrypting a file which is not encrypted and which is different from the non-encrypted first file.

2. The apparatus according to claim 1, wherein said extraction means extracts the character string and position information of the character string from the non-encrypted first file, and
    said registration means registers the character string and the position information of the character string extracted by said extraction means in the database as the information used to search for the encrypted second file.

3. The apparatus according to claim 1, wherein said registration means registers the encrypted second file, and registers the character string extracted by said extraction means in the database as the information used to search for the encrypted second file.

4. A method of controlling a server apparatus, the method comprising:
    an extraction step of extracting a character string from a non-encrypted first file;
    a registration step of registering the character string extracted in the extraction step in a database as information used to search for an encrypted second file; and
    a deletion step of deleting the non-encrypted first file after said extraction step extracts the character string from the non-encrypted first file,
    wherein the encrypted second file is obtained by encrypting a file which is not encrypted and which is different from the non-encrypted first file.

5. The method according to claim 4, wherein in the extraction step, the character string and position information of the character string are extracted from the non-encrypted first file, and
    in the registration step, the character string and the position information of the character string extracted in the extraction step are registered in the database as the information used to search for the encrypted second file.

6. The method according to claim 4, wherein in the registration step, the encrypted second file is registered, and the character string extracted in the extraction step is registered in the database as the information used to search for the encrypted second file.

7. A non-transitory computer readable storage medium storing a computer-executable program for making a computer execute a control method of claim 4.

* * * * *